US009135793B1

(12) United States Patent
Pfab et al.

(10) Patent No.: US 9,135,793 B1

(45) Date of Patent: Sep. 15, 2015

(54) FORCE FEEDBACK TO IDENTIFY CRITICAL EVENTS

(71) Applicants: Adam W. Pfab, Cedar Rapids, IA (US); Nicholas A. Barbaro, Marion, IA (US); Andrew J. LeVake, Cedar Rapids, IA (US)

(72) Inventors: Adam W. Pfab, Cedar Rapids, IA (US); Nicholas A. Barbaro, Marion, IA (US); Andrew J. LeVake, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 101 days.

(21) Appl. No.: 13/908,754

(22) Filed: Jun. 3, 2013

(51) Int. Cl.
*H04B 3/36* (2006.01)
*G08B 6/00* (2006.01)

(52) U.S. Cl.
CPC .......................................... *G08B 6/00* (2013.01)

(58) Field of Classification Search
CPC .......... G01S 13/88; G01S 7/021; G06F 3/016
USPC ............ 340/407.1, 435, 903, 425.5, 965, 7.6, 340/825.19, 667, 988
See application file for complete search history.

(56) References Cited

U.S. PATENT DOCUMENTS

| | | | | |
|---|---|---|---|---|
| 5,339,244 | A * | 8/1994 | Stiles et al. | 701/14 |
| 6,144,619 | A * | 11/2000 | Reisman | 368/10 |
| 7,369,042 | B2 * | 5/2008 | Osaka et al. | 340/435 |
| 8,594,864 | B2 * | 11/2013 | Greenfield et al. | 701/14 |
| 2005/0073439 | A1 * | 4/2005 | Perricone | 340/945 |
| 2009/0099479 | A1 * | 4/2009 | Solanki et al. | 600/586 |
| 2011/0218953 | A1 * | 9/2011 | Hale et al. | 706/46 |
| 2014/0038137 | A1 * | 2/2014 | Hill | 434/62 |

* cited by examiner

*Primary Examiner* — Daniel Previl

(74) *Attorney, Agent, or Firm* — Angel N. Gerdzhikov; Donna P. Suchy; Daniel M. Barbieri

(57) ABSTRACT

Force feedback elements are incorporated at various points in a flight helmet. An onboard computer system identifies critical events and translates such events into a force feedback pulse applied to one or more of the force feedback elements, warning the pilot of the critical event while at the same time suppressing more conventional critical event warnings that may distract a pilot. Additionally, force feedback elements are incorporated into a vest, bodysuit or body armor. A mobile, personal computer system applies a force feedback pulse to one or more of the force feedback elements to indicate an event that might otherwise require an audible signal.

17 Claims, 4 Drawing Sheets

FORCE FEEDBACK TO IDENTIFY CRITICAL EVENTS

FIELD OF THE INVENTION

The present invention is directed generally toward tactile force feedback systems, and more particularly to force feedback systems for critical events.

BACKGROUND OF THE INVENTION

In a combat aircraft, an onboard computer system may detect situations requiring the pilot's attention (critical events). By their nature, critical events may occur concurrently. In a system that alerts pilots of critical events via an audible warning, obtrusive visual warning, or both, the pilot may become distracted, or information necessary to manage one critical event may be obfuscated by the warning of another critical event. For example, useable area on a display is limited and displaying information pertinent to one critical event may prevent the display of information pertinent to another critical event, especially where critical events necessitate a prominent visual warning on the display to ensure the pilot is aware of the situation.

Modern infantry soldiers are highly connected and reliant on data communication through personal computing devices. However, in combat, where information is most critical, infantry soldiers are in closest proximity to enemy combatants and therefore may be in the greatest need of stealth. Lights or sounds indicating the receipt of critical information is undesirable.

Consequently, it would be advantageous if an apparatus existed that is suitable for providing a tactile indication of a critical event without causing unnecessary distraction.

SUMMARY OF THE INVENTION

Accordingly, the present invention is directed to a novel method and apparatus for providing a tactile indication of a critical event without causing unnecessary distraction.

In at least one embodiment of the present invention, force feedback elements are incorporated at various points in a flight helmet. An onboard computer system identifies critical events and translates such events into a force feedback pulse applied to one or more of the force feedback elements, warning the pilot of the critical event while at the same time suppressing more conventional critical event warnings that may distract a pilot.

In another embodiment of the present invention, force feedback elements are incorporated into a vest, bodysuit or body armor. A mobile, personal computing system may apply a force feedback pulse to one or more of the force feedback elements to indicate an event that might otherwise require an audible signal.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
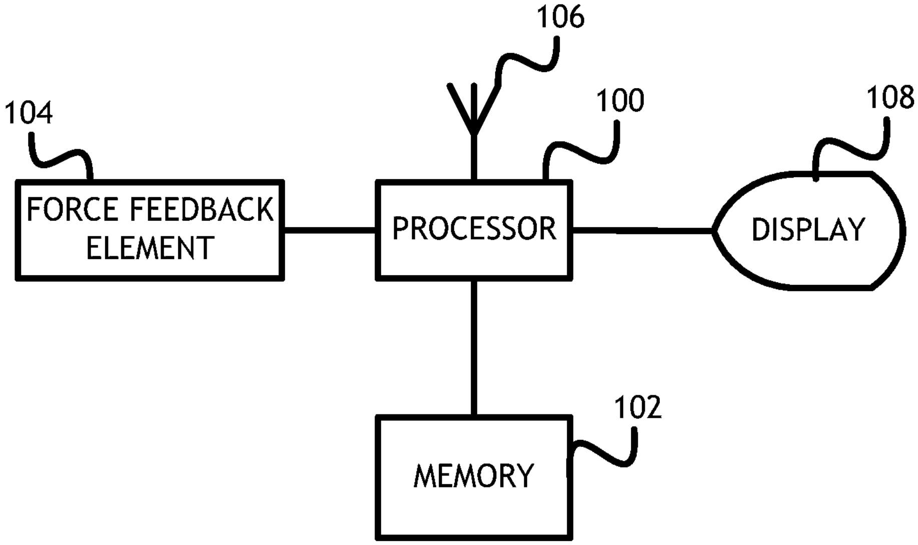
FIG. 1 shows a block diagram of a computer system useful for implementing embodiments of the present invention.

Referring to FIG. 1, a block diagram of a computer system useful for implementing embodiments of the present invention is shown. In at least one embodiment of the present invention, a processor 100 is connected to a memory 102 and one or more force feedback elements 104. The processor 100 may be part of an on board flight computer, some other in-vehicle computer system, a mobile personal computing device, or any other mobile computing platform. Furthermore, the processor 100 may be connected to an antenna 106 for receiving data and a display 108 for displaying pertinent information.

In one embodiment of the present invention, an aircraft may house a computer system according to the present invention. The processor 100, detecting a critical event or otherwise receiving data through the antenna 106 indicating a critical event, may determine a signal to apply to the one or more force feedback elements 104 to produce a tactile sensation. The tactile sensation may alert the pilot that a critical event has occurred. Different signals may produce different tactile sensations indicating different critical events or events of varying criticality. Furthermore, the processor 100 may display information pertaining to the critical event on the display 108 in a minimally intrusive way because obtrusive warnings are no longer necessary as the pilot is notified by alternative means.

In another embodiment of the present invention, the processor 100, incorporated into personal computing device, may receive a signal through the antenna 106. The signal may include embedded data indicating that the signal contains critical information. The processor 100 may detect such embedded data and determine a signal to apply to the one or more force feedback elements 104 to produce a tactile sensation.

Figure 2:
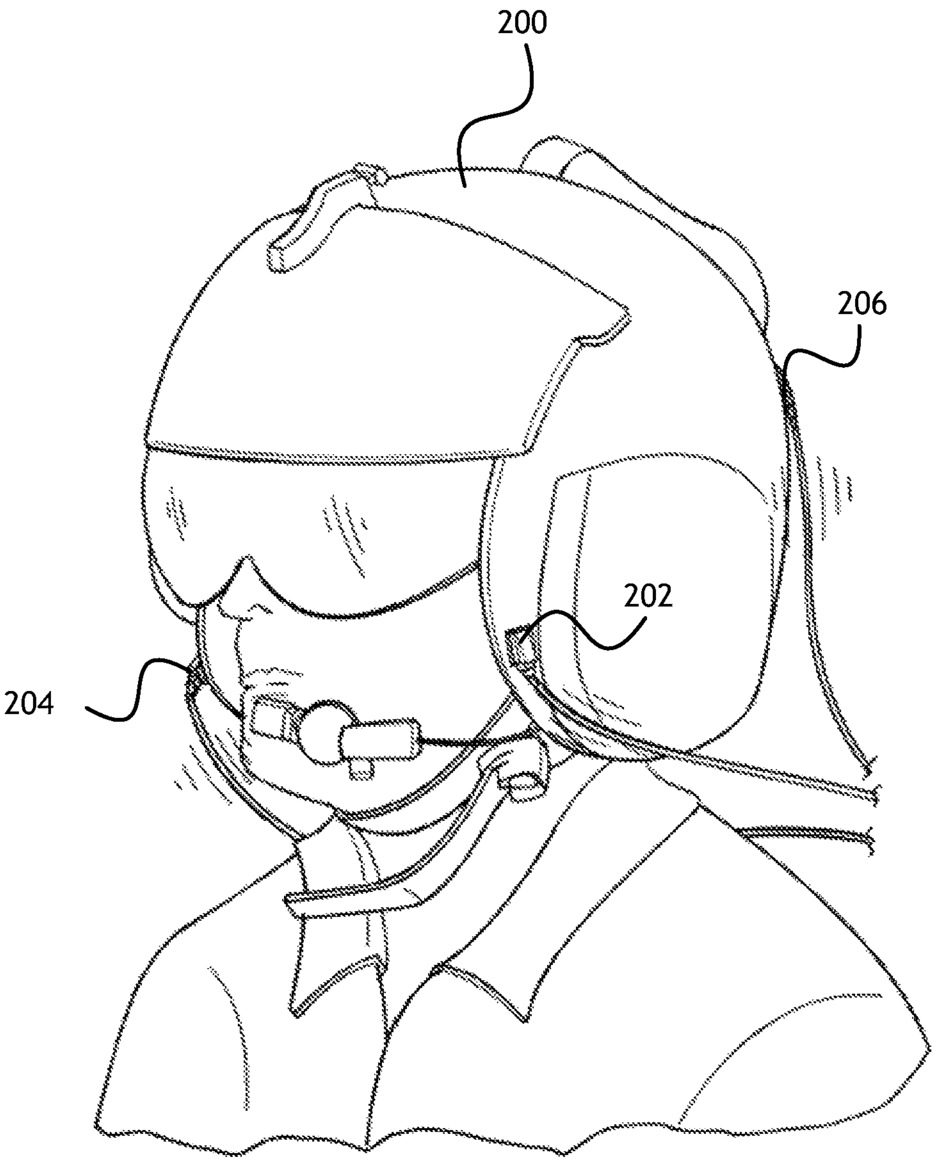
FIG. 2 shows a perspective, environmental view of a flight helmet including an embodiment of the present invention.

Referring to FIG. 2, a perspective, environmental view of a flight helmet including an embodiment of the present invention is shown. A flight helmet 200 may include a plurality of force feedback elements 202, 204, 206 affixed to particular locations on or within the flight helmet 200. For example, a first force feedback element 202 may be affixed or embedded at the left jaw line of the flight helmet 200, a second force feedback element 204 may be affixed or embedded at the right jaw line of the flight helmet 200 and a third force feedback element 206 may be affixed or embedded at the rear of the flight helmet 200. The force feedback elements 202, 204, 206 are positioned to produce a tactile sensation to the wearer; for example, in at least one embodiment, the force feedback elements 202, 204, 206 are embedded in the helmet so as to be in substantial physical contact with wearer. A person skilled in the art may appreciate that while FIG. 2 shows the force feedback elements 202, 204, 206 on the outer surface of the helmet 200, such illustration is only for clarity and should not be considered limiting. Each of the force feedback elements 202, 204, 206 is connected to a computing device such that the computing device may apply signals to each of the force feedback elements 202, 204, 206 to produce tactile pulses that may be felt and distinguished by the pilot wearing the flight helmet 200.

Signals to each force feedback element 202, 204, 206 may indicate critical events that require a pilot's attention. Signals to each force feedback element 202, 204, 206 may also vary to indicate data pertinent to a critical event. For example, where an onboard computer system detects a critical event behind the aircraft or receives data pertaining to a critical event behind the aircraft, the computer system may apply a signal to the third force feedback element 206 to indicate to the pilot that a critical event has occurred behind the aircraft.

Likewise, where an onboard computer system detects a critical event to the left or right of the aircraft or receives data pertaining to such a critical event, the computer system may apply a signal to the first force feedback element 202 or the second force feedback element 204 respectively to indicate a location of the critical event. Alternatively, two or more force feedback elements 202, 204, 206 may be activated in sequence to indicate information pertaining to a critical event, such as a direction relative to the aircraft. For example, when attempting to re-acquire a target, the onboard computer system may active one of the force feedback elements 202, 204, 206 to indicate the relative direction of that target.

Furthermore, the onboard computer system may apply varying signals to the one or more force feedback elements 202, 204, 206. For example, the onboard computer system may apply a signal to produce a pulse having a first frequency to indicate one level of criticality, or a pulse having a second frequency to indicate a different level of criticality. Alternatively, signals may vary the magnitude of a pulse.

In another embodiment, where an onboard computer system detects or receives data pertaining to multiple critical events, the onboard computer system may determine multiple disparate locations pertaining to each critical event relative to the aircraft. The onboard computer system may then apply signals to two or more of the force feedback elements 202, 204, 206 to indicate to the pilot the relative locations of each critical event. Furthermore, the onboard computer system may vary each signal to indicate relative levels of criticality associated with each critical event.

Figure 3:
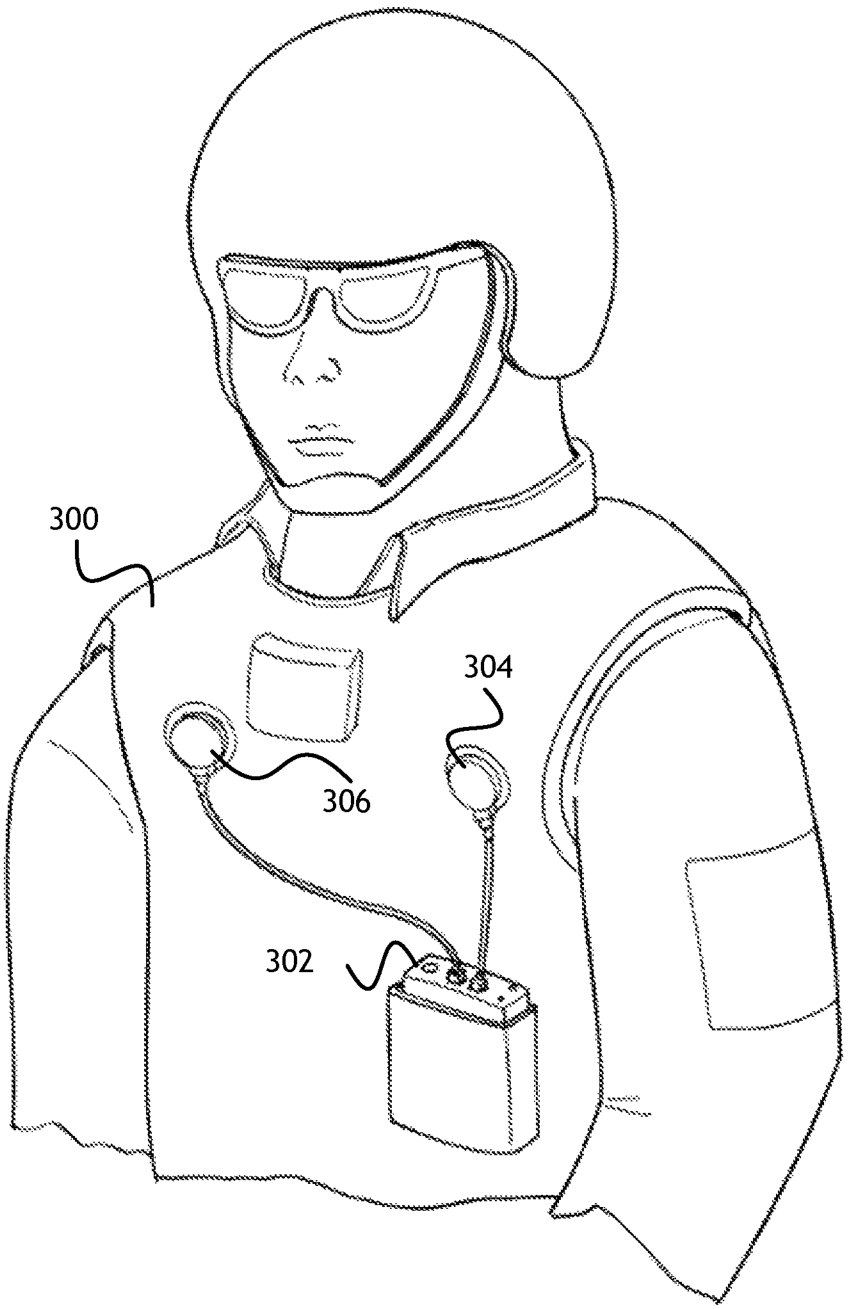
FIG. 3 shows a perspective, environmental view of a vest including an embodiment of the present invention.

Referring to FIG. 3, a perspective, environmental view of a vest including an embodiment of the present invention is shown. The vest 300 may include a plurality of force feedback elements 304, 306 affixed to particular locations on or within the vest 300. For example, a first force feedback element 304 may be affixed or embedded in the upper left quadrant of the vest 300 and a second force feedback element 306 may be affixed or embedded in the upper right quadrant of the vest 300. The force feedback elements 304, 306 are positioned to produce a tactile sensation to the wearer; for example, in at least one embodiment, the force feedback elements 304, 306 are embedded in the vest so as to be in substantial physical contact with wearer. A person skilled in the art may appreciate that while FIG. 3 shows the force feedback elements 304, 306 on the outer surface of the vest 300, such illustration is only for clarity and should not be considered limiting. Each of the force feedback elements 304, 306 is connected to a portable computing device 302 such that the portable computing device 302 may apply signals to each of the force feedback elements 304, 306 to produce tactile pulses that may be felt and distinguished by the person wearing the vest 300.

Signals to each force feedback element 304, 306 may indicate critical information received by the portable computing device 302 that may require attention. Signals to each force feedback element 304, 306 may also vary to indicate data pertinent to the critical information. For example, where a portable computing device 302 receives critical information, the portable computing device 302 may apply a signal to one or more of the force feedback elements 304, 306 depending on some data embedded in the critical information such as criticality or relative location if the portable computing device 302 has access to information pertaining to its own relative location. In another example, tactile pulses produced by force feedback elements may function as silent "friendly" indicators in a battlefield situation.

Furthermore, the portable computing device 302 may apply varying signals to the one or more force feedback elements 304, 306. For example, the portable computing device 302 may apply a signal to produce a pulse having a first frequency to indicate one level of criticality, or a pulse having a second frequency to indicate a different level of criticality. Alternatively, signals may vary the magnitude of a pulse.

In another embodiment, each force feedback element 304, 306 may be specifically associated with one or more types of critical information. Where the portable computing device 302 receives multiple types of critical information, the portable computing device 302 may determine and apply multiple disparate signals to two or more force feedback elements 304, 306. Furthermore, the portable computing device 302 may vary each signal to indicate relative levels of criticality associated with each type of critical information.

Figure 4:
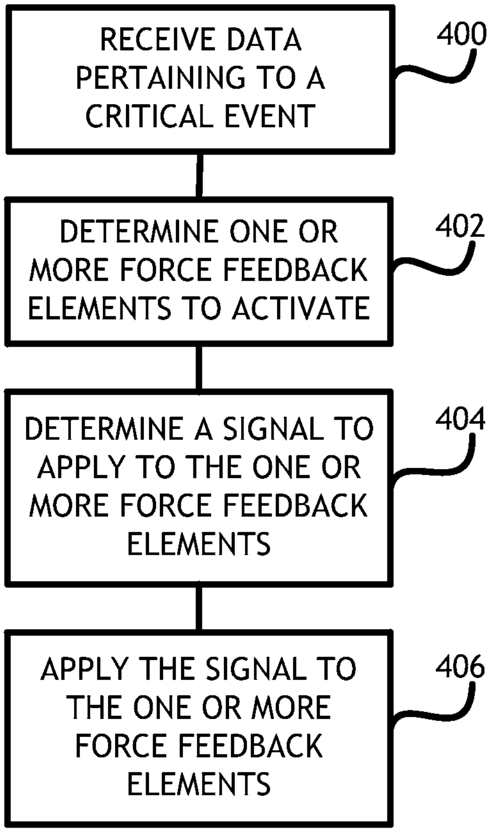
FIG. 4 shows a flowchart of a method for signaling a critical even with force feedback elements according to one embodiment of the present invention.

Referring to FIG. 4, a flowchart of a method for signaling a critical event with force feedback elements according to one embodiment of the present invention is shown. A computer system executing such method may receive 400 data pertaining to a critical event. Data pertaining to a critical event may include the existence of such critical event, the location of such critical event, the relative criticality of such critical event or other pertinent information.

The computer system may determine 402 one or more force feedback elements to activate based on the data. For example, where the data indicates the location of a critical event, the computer system may select a force feedback element indicating the relative location of the critical event. Alternatively, certain force feedback elements may be associated with certain critical events such that the activation of a force feedback element or combination of force feedback elements indicates a particular critical event or type of critical event.

The computer system may then determine 404 one or more signals to apply to the selected force feedback elements. The signals may be configured to produce a pulse in the force feedback elements having a desirable frequency, or some combination of frequencies in two or more force feedback elements. The signals may also vary the magnitude of pulses in the force feedback elements. The computer system may then apply 406 such signals to the selected force feedback elements.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer apparatus comprising:
- a processor;
- memory connected to the processor;
- a plurality of force feedback elements connected to the processor, at least two of the plurality of force feedback elements disposed on a flight helmet; and
- computer executable program code configured to execute on the processor,
- wherein the computer executable program code is configured to:
  - receive information pertaining to a critical event;
  - derive a location of a critical event;
  - select at least one of the plurality of force feedback elements disposed on the flight helmet to indicate the derived location; and
  - apply a signal to the selected force feedback elements to produce a tactile pulse.

2. The computer apparatus of claim 1, further comprising an antenna connected to the processor, wherein the computer executable program code is further configured to receive remote data pertaining to a critical event through the antenna.

3. The computer apparatus of claim 1, wherein the computer executable program code is further configured to configure the signal to produce a tactile pulse having a particular frequency.

4. The computer apparatus of claim 3, wherein the computer executable program code is further configured to configure a second signal to produce a second tactile pulse in at least one of the plurality of force feedback elements having a second particular frequency.

5. The computer apparatus of claim 4, wherein the particular frequency and the second particular frequency indicate disparate criticality.

6. The computer apparatus of claim 1, wherein the computer executable program code is further configured to configure the signal to produce a tactile pulse having a particular magnitude.

7. The computer apparatus of claim 6, wherein the computer executable program code is further configured to configure a second signal to produce a second tactile pulse in at least one of the plurality of force feedback elements having a second particular magnitude.

8. The computer apparatus of claim 7, wherein the particular magnitude and the second particular magnitude indicate disparate criticality.

9. A method for indicating a critical event comprising:
- receiving information pertaining to a critical event;
- deriving a location of a critical event;
- selecting at least one force feedback element from a plurality of force feedback elements, at least two of the plurality of force feedback elements disposed on a flight helmet to indicate the derived location; and
- applying a signal to the selected force feedback elements to produce a tactile pulse.

10. The method of claim 9, further comprising configuring the signal to produce a tactile pulse having a particular frequency.

11. The method of claim 10, further comprising configuring a second signal to produce a second tactile pulse in at least one force feedback element having a second particular frequency.

12. The method of claim 11, wherein the particular frequency and the second particular frequency indicate disparate criticality.

13. The method of claim 9, further comprising configuring the signal to produce a tactile pulse having a particular magnitude.

14. The method of claim 13, further comprising configuring a second signal to produce a second tactile pulse in at least one force feedback element having a second particular magnitude.

15. The method of claim 14, wherein the particular magnitude and the second particular magnitude indicate disparate criticality.

16. An apparatus for signaling one or more critical events comprising:
- a receiving means for receiving data pertaining to one or more critical events;
- a pulse signaling means for producing and applying one or more signals to one or more tactile feedback means;
- a plurality of tactile feedback means for producing one or more tactile pulses, at least two of the plurality of tactile feedback means disposed on a flight helmet; and
- a display means for displaying critical information indicated by the one or more tactile feedback means,
- wherein:
  - the pulse signaling means is configured to cause the at least two of the plurality of tactile feedback means to produce a tactile pulse; and
  - each of the one or more tactile pulses indicates a relative location of a critical event.

17. The apparatus of claim 16, wherein the one or more tactile pulses indicate the relative criticality of a critical event.

* * * * *